United States Patent Office 3,142,637
Patented July 28, 1964

3,142,637
FLOCCULATING AGENT AND PROCESS FOR DIGESTED BAUXITE SLURRIES
George W. Cook, Benton, Ark., assignor to Reynolds Metals Company, Richmond, Va., a corporation of Delaware
No Drawing. Filed Jan. 31, 1961, Ser. No. 85,990
8 Claims. (Cl. 210—52)

This invention relates to a novel process for the flocculation of insoluble positions of aluminiferous ores from alkali metal aluminate liquors obtained by the digestion of such ores with caustic alkali solutions. More particularly the invention concerns a novel flocculating agent and settling aid for the separation of the said insoluble ore portions comprising starch together with a compound of bivalent lead, and the process of using same.

The processing of aluminiferous ores and especially bauxite in order to extract the aluminum content in the form of alumina or alumina hydrate is conventionally carried out, in accordance with the Bayer process, by digestion with a hot solution of sodium hydroxide. The alumina content of the ore thereby goes into solution in the sodium hydroxide, forming a solution of sodium aluminate. The ore constituents not soluble in the sodium hydroxide solution, known as red mud, and including iron oxide, silica, and other impurities, form a slurry with the sodium aluminate solution. The major proportion of the red mud is separated from the sodium aluminate solution by subjecting the slurry to a thickening or sedimentation operation as it leaves the digesters, accompanied by decantation of the partially clarified sodium aluminate solution. The bulk of the red mud is separated from the green liquor in the sedimentation step. The decanted sodium aluminate solution, however, carries in suspension a small amount of red mud or insoluble matter in the form of very finely divided particles. It is commonly filtered in a final clarifying step and the filtered sodium aluminate liquor is subsequently subjected to hydrolysis and the alumina recovered in the form of alumina hydrate by autoprecipitation, in accordance with conventional procedures.

It has become established practice to subject the alkali metal aluminate liquor produced by the digestion of the aluminiferous ores to a treatment involving the addition of starch, wherein the starch acts as a flocculant or settling aid. It is preferred to employ causticized starch, i.e. starch which has been cooked with sodium hydroxide to facilitate its solubilization. There are certain disadvantages attendant upon this procedure. The cost of starch forms a very considerable item of expense and, moreover, the amounts used increase the quantity of organic matter in the sodium aluminate solution, thus acting as a contaminant. Accordingly, efforts have been made in the aluminum industry to achieve a more economical and effective utilization of starch, while at the same time retaining its advantages as a settling aid, or if possible improving its flocculating power.

In accordance with this invention, it has been found that the flocculating and settling power of starch in the settling or sedimentation of digested aluminiferous ore slurries is, surprisingly and unexpectedly, increased to a remarkable extent in the presence of a compound of bivalent lead. The compounds of bivalent lead which are suitable for use in accordance with the invention are advantageously those compounds which are compatible with or soluble in alkali metal hydroxide solutions. Compounds of this class include lead monoxide (litharge) PbO, lead hydroxide Pb(OH)$_2$, lead chloride PbCl$_2$, lead oxychloride PbO.PbCl$_2$, basic lead carbonate 2PbCO$_3$.Pb(OH)$_2$ lead sulfate PbSO$_4$, lead chromate PbCrO$_4$, lead oxalate PbC$_2$O$_4$, lead phosphate Pb$_3$(PO$_4$)$_2$, and lead tartrate PbC$_4$H$_4$O$_6$.H$_2$O, and the like. However, it is preferable to employ bivalent lead compounds which will not furnish inorganic or organic contaminants to the sodium aluminate solution and thence to the alumina itself.

Accordingly, the preferred lead compound for the purposes of the present invention is lead monoxide PbO, and it is this compound which will be employed for purposes of illustration.

The PbO may be employed either as such or in the form of its solution in an alkali metal hydroxide, for example as sodium plumbite. The latter may be prepared either by dissolving PbO in sodium hydroxide solution, or by dissolving metallic lead in a strong caustic soda solution. If there is insufficient sodium hydroxide present to dissolve all the lead monoxide, the latter is obtained in the form of a slurry.

The use of a bivalent lead compound, such as lead monoxide, as a promotor for the settling action of starch, in accordance with the invention, possesses two unusual aspects. First, it should be noted that neither PbO nor the other lead compounds mentioned possess any flocculating or settling action by themselves, but only exhibit their extraordinary promoting action in combination with starch. Second, if the lead is present in other valency states, such as in lead dioxide PbO$_2$ or in red lead Pb$_3$O$_4$, no effect in improving the flocculating power of starch occurs.

The lead compounds may be employed in conjunction with any of the starches commonly used for settling aluminifierous ore residues (red mud), including corn starch, tapioca starch, pearly starch, potato starch, casava, and the like. The lead monoxide is as effective with the starch regardless of any pretreatment to which the starch may be subjected, such as for example, cooking, causticization, homogenization, and the like. Ordinarily, however, causticized starch is utilized for settling.

The amount of bivalent lead compound employed, in accordance with the invention, will generally comprise at least about 40% by weight of the starch, and not more than about 80% by weight. The upper limit is determined by the necessity of avoiding the introduction of extraneous metal ions into the sodium aluminate solution which might later be precipitated with and contaminate the alumina hydrate. The use of lead monoxide within the range indicated does not introduce any significant amount of lead into the sodium aluminate solution and there is no noticeable effect upon the purity of the resulting alumina.

The lead compound can be added to the digester slurries to be settled or sedimented either prior to, or simultaneously with, or following the addition of the starch. Suitable digester slurries include those obtained in the treatment of both domestic and imported bauxite ores, including those of the Caribbean area. The latter bauxites are especially difficult to settle and normally require heavy dosages of starch. The advantages of the starch-lead compound settling aid combination are especially marked in the treatment of such ores.

The flocculating agents prepared in accordance with this invention, by reason of their greatly augmented settling power impart to the settling process the advantages of (1) saving in the amount of starch required, (2) increasing the capacity of existing red mud sedimentation facilities, (3) imparting better mud compaction and mud washing efficiency, thereby permitting greater recoveries of the soluble components in the red mud, and (4) resulting in less evaporation of recycled liquor by reason of less dilution from washing.

The amount of starch to be added to the bauxite slurries for settling purposes will generally range from about 0.25% to about 1.5% by weight of the red mud. The preferred amounts of starch and lead compound, expressed in terms of pounds per ton of bauxite ore treated are about 5 pounds of starch and 2 pounds of lead compound (lead oxide).

Preparation of the starch flocculant is carried out in accordance with conventional practice in the art. Starch is added to water and dispersed by means of a mechanical blender until all lumps are broken down. The suspension is causticized by the addition of NaOH, and dispersion continued for a time sufficient to assure complete blending. For purposes of the invention, the starch suspension should contain about 2% to 10% starch and about 1% to 5% NaOH, preferably about 1% NaOH and about 5% starch.

The lead oxide solution for use in conjunction with the starch flocculant is prepared by dissolving lead monoxide in a solution of sodium hydroxide. The resulting solution may contain from 0.1% to about 2% PbO and about 5% to 15% NaOH, preferably about 0.5% PbO and 10% NaOH. If the lead oxide preparation is to be stored for any length of time, however, a small quantity of metallic lead is added to prevent oxidation of bivalent lead to a higher valence state. Alternatively, the lead solution may be prepared directly from lead metal itself, as previously mentioned, in which case an excess of the metal is provided over that taken into solution, for the same reason.

The following test data are illustrative and demonstrate the improved flocculation and settling obtained using the starch-lead oxide mixtures of this invention.

Digested Jamaica bauxite slurry as collected from Bayer plant digesters was employed as a test material. This slurry contained 30 grams per liter of solids expressed as washed dry residue.

A starch flocculant preparation was made by adding 20 grams of starch suspension to 370 ml. of water and dispersing the starch by means of a mechanical blender until all lumps had been broken down. Ten grams of 40% NaOH were then added and the dispersion continued for 5 minutes. The resulting suspension contained 5% starch (dry basis) and 1% NaOH, by weight. The suspension was used both for control tests and for the starch-lead oxide tests.

A solution of lead monoxide for use with the starch flocculant was prepared by dissolving 5 g.p.l. of PbO in a solution of NaOH containing 100 g.p.l. NaOH, and a small quantity of lead metal was added to prevent oxidation of lead.

Floc formation time was measured by noting the time required for the mud to flocculate and settle the first 100 ml.

The settling rate was determined by filling 1000 ml. graduated cylinders to the 1000 ml. mark with the slurry and noting the time taken for the liquor-solid line to settle between the 900 ml. and the 500 ml. graduations on the cylinder. The settling rate was calculated by dividing the distance travelled by the liquor-solid line from 900 ml. to 500 ml., expressed in cms., by the time in minutes taken to cover the stated distance. The settling rate is thus expressed as cms./minute.

In order to compute the percent of solids in the consolidated mud, the settled volume of the mud slurry was noted. The supernatant liquor was decanted off. The mud was filtered, washed, dried, and weighed. The densities of the supernatant liquor and of the dried mud were determined. The compaction was calculated as percent solids, using the formula:

$$\text{Consolidation (percent solids)} = \frac{Wm \times 100}{Wm + dl\left(SV - \frac{Wm}{dm}\right)}$$

wherein:

$Wm$ is washed dry mud weight
$dl$ is liquor density at settling temperature
$SV$ is mud slurry volume at end of settling period
$dm$ is absolute density of mud (3.75 gm./cc.)

Tests were carried out with conventional starch flocculant alone (control), and with lead monoxide added with the starch, before the starch, and after addition of the starch. Where the conventional starch flocculant alone was used, half the calculated quantity was added to a 1000 ml. graduated cylinder, the slurry was added to the 1000 ml. mark and the remaining half of the flocculant was added to the top of the slurry. Two strokes of a plunger agitator were made for the starch dispersion. Where the PbO was added with the starch, the calculated quantity of 5 g.p.l. PbO solution was mixed with the calculated quantity of starch flocculant and added as before. Where the PbO was added before the starch, the calculated quantity was added to the slurry from a 5 g.p.l. PbO solution and dispersed. Conventional starch flocculant was then added as before. Where the lead oxide was added after the starch, the starch was first added to the cylinder as in the instance where it was used alone, then the PbO solution was added from a 5 g.p.l. solution to the top of the slurry in the cylinder and dispersed with two strokes of the agitator.

The effect of simultaneous addition of starch and lead monoxide flocculating agent on the settling of digested Jamaica bauxite slurry is shown in Table 1:

TABLE 1

*Effect of Starch-PbO Flocculant on Flocculation and Settling of Digested Jamaica Bauxite Slurry*

(Digestion conditions—145 g.p.l., NaOH expressed as $Na_2CO_3$; Temp. 190° F.—30 minutes. 5 lbs. of causticized starch per ton of bauxite)

| PbO Added, lbs./ton of Bauxite | Floc Formation Time (Seconds) | Settling Rate (cm./min.) | Percent Solids in Consolidated Mud after 30 Min. |
|---|---|---|---|
| None (control) | 180 | 5 | 20 |
| 2 | 102 | 8 | 26 |

It will be seen from the above table that inclusion of the lead oxide preparation with the starch flocculant speeds the floc formation, increases the settling rate, and effects better consolidation of the settled mud.

The influence of treating sequence, with starch flocculant and lead oxide preparation, upon the settling of digested Jamaica bauxite slurry, is shown in Table 2:

TABLE 2

*Effect of Order of Addition of Starch Flocculant and Lead Oxide Preparation to Digested Jamaica Bauxite Slurry*

(Digestion conditions—145 g.p.l. NaOH expressed as $Na_2CO_3$. Temperature 190° F.—30 minutes. 5 lbs. causticized starch/ton bauxite. 2 lbs. PbO/ton bauxite)

| Order of Addition | Floc Formation Time (Seconds) | Settling Rate, cm./min. |
|---|---|---|
| Starch flocculant (control) | 104 | 13 |
| Lead oxide preparation added before starch addition | 65 | 21 |
| Lead oxide preparation added with starch addition | 50 | 20 |
| Lead oxide preparation added after starch addition | 55 | 18 |

It will be seen from the above table that the order of addition of starch flocculant and lead oxide preparation has no significant effect on settling of Jamaica bauxite slurry.

It should be noted, however, that if the lead oxide preparation is added to the starch suspension, the resulting mixture should be added immediately to the slurry to be flocculated. Prolonged contact of PbO and starch, before addition to the slurry to be flocculated, results in a highly viscous starch suspension which has substantially less flocculating power.

The insignificant contamination of the sodium aluminate liquor with lead compounds following flocculating treatment is shown in Table 3:

TABLE 3

*Analysis of Clarified Sodium Aluminate Liquor Discharged From Settling Operation Using Starch-PbO Flocculant*

(Flocculant used: 5 lbs. starch/ton bauxite and 2 lbs. PbO/ton bauxite)

| Treatment of liquor: | P.p.m.[1] PbO in liquor |
|---|---|
| Centrifuged | 11 |
| Filtered through cotton duck (as in Bayer process) | 8 |

[1] Determined spectrographically.

The following examples illustrate the practice of the invention, but are not to be regarded as limiting.

EXAMPLE 1

93.5 grams of Jamaican bauxite are taken in 790 ml. of caustic soda solution from the Bayer plant containing about 230 g.p.l. NaOH as $Na_2CO_3$, 70 g.p.l. $Al_2O_3$, and 275 g.p.l. total $Na_2CO_3$. The charge of bauxite and liquor is taken in correct proportion to give a ratio of $Al_2O_3$ to NaOH (expressed as $Na_2CO_3$) in the digested liquor about 0.60. The charge of bauxite and liquor is heated in a closed rotating steel bomb for 30 minutes at 390° F. At the end of the digestion the contents of the bomb are blown off into a tank. There is some loss of water as steam during blowing off.

4.7 grams of 5% refined starch suspension (calculated to give a starch loading of 5 pounds of dry starch per ton of bauxite) are diluted with 260 ml. of water and the diluted starch solution is divided into two equal portions. One portion of the starch suspension is added to a 1 liter graduated glass cylinder and the mud slurry from the bomb digest is added to the glass cylinder. The other half of the starch suspension is then added to make total volume of one liter. Two strokes of a plunger agitator are given to mix the starch suspension with mud slurry.

18.72 grams of 0.5% PbO preparation are added (calculated to give a PbO loading of 2 lbs. of starch per ton of bauxite) to the slurry in the glass cylinder and two strokes of a plunger agitator are given. The glass cylinder is placed in a water bath at 210° F. Rakes are placed in the mud slurry and rotated at 3 r.p.m. The settling rate is found to be 18 cm./min. The 30 minutes consolidation of the mud is 24% solids.

EXAMPLE 2

The procedure of Example 1 is followed, except that the lead oxide preparation is added to the slurry before the starch flocculant is added. The settling rate is 17 cms./min. and the 30 minutes consolidation of the mud is 24% solids.

While present preferred embodiments of the invention have been described, it will be recognized that the invention may be otherwise variously embodied and practiced within the scope of the following claims.

What is claimed is:

1. Process for the flocculation of insoluble portions of aluminiferous ores from alkali metal aluminate liquors obtained by the digestion of said ores with caustic alkali solutions, which comprises adding to a slurry of said insoluble ore portions in said aluminate liquors a flocculating and settling agent comprising starch in an amount from about 0.25% to about 1.5% by weight of said insoluble ore portions and from about 40% to about 80% by weight of the starch, of a compound of bivalent lead.

2. Process for the flocculation of insoluble portions of aluminiferous ores from alkali metal aluminate liquors obtained by the digestion of said ores with caustic alkali solutions, which comprises adding to a slurry of said insoluble ore portions in said aluminate liquors a flocculating and settling agent comprising starch in an amount from about 0.25% to about 1.5% by weight of said insoluble ore portions and from about 40% to about 80% by weight of the starch, of lead monoxide.

3. Process for the flocculation of insoluble portions of aluminiferous ores from alkali metal aluminate liquors obtained by the digestion of said ores with caustic alkali solutions, which comprises adding to a slurry of said insoluble ore portions in said aluminate liquors a flocculating and settling agent comprising starch and lead monoxide, the amount of starch being about 5 pounds and of lead monoxide being about 2 pounds, respectively, per ton or ore treated.

4. A flocculating and settling agent for flocculation of the insoluble portions of aluminiferous ores in the form of slurries in alkali metal aluminate liquors obtained by digestion of said ores with caustic alkali solutions, comprising a suspension of from about 2% to about 10% by weight of starch in about 1% to about 5% by weight sodium hydroxide solution, said sodium hydroxide containing in solution between about 40% and about 80% by weight of the starch, of a compound of bivalent lead.

5. A flocculating and settling agent for flocculation of the insoluble portions of aluminiferous ores in the form of slurries in alkali metal aluminate liquors obtained by digestion of said ores with caustic alkali solutions, comprising a suspension of from about 2% to about 10% by weight of starch in solution of about 1% to about 5% by weight sodium hydroxide, said sodium hydroxide containing in solution between about 40% and about 80% by weight of the starch, of lead monoxide.

6. A flocculating and settling agent for flocculation of the insoluble portions of aluminiferous ores in the form of slurries in alkali metal aluminate liquors obtained by digestion of said ores with caustic alkali solutions, comprising a suspension of from about 2% to about 10% by weight of starch in about 1% to about 5% by weight sodium hydroxide solution, said sodium hydroxide containing in solution between about 40% and about 80% by weight of the starch, of lead monoxide and an amount of lead metal sufficient to prevent oxidation of the lead monoxides.

7. The process of claim 1 in which the aluminiferous ore is bauxite.

8. The process of claim 1 in which the slurry is a digested bauxite slurry.

References Cited in the file of this patent

UNITED STATES PATENTS

| 1,198,100 | Bloede | Sept. 12, 1916 |
| 1,973,999 | Urbain | Sept. 18, 1934 |
| 2,188,933 | Weinig | Feb. 6, 1940 |
| 2,216,844 | Kuhl | Oct. 8, 1940 |
| 2,280,998 | Brown | Apr. 28, 1942 |
| 2,468,207 | Kerr | Apr. 26, 1949 |
| 2,685,369 | Crossley | Aug. 3, 1954 |
| 2,937,143 | Goren | May 17, 1960 |

FOREIGN PATENTS

| 861,741 | France | Nov. 4, 1940 |
| 487,987 | Canada | Nov. 11, 1952 |